US006999088B1

(12) United States Patent
Van Dyke et al.

(10) Patent No.: US 6,999,088 B1
(45) Date of Patent: Feb. 14, 2006

(54) MEMORY SYSTEM HAVING MULTIPLE SUBPARTITIONS

(75) Inventors: James M. Van Dyke, Austin, TX (US); John S. Montrym, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/746,320

(22) Filed: Dec. 23, 2003

(51) Int. Cl.
*G06F 12/02* (2006.01)

(52) U.S. Cl. ........................ 345/544; 345/543; 711/173

(58) Field of Classification Search ................ 345/537, 345/540–547; 711/147, 150, 157, 170, 173
See application file for complete search history.

(56) References Cited

U.S. PATENT DOCUMENTS 5,109,520 A 4/1992 Knierim
5,408,606 A 4/1995 Eckart
5,452,299 A 9/1995 Thessin et al.
5,485,586 A 1/1996 Brash et al.
5,500,939 A 3/1996 Kurihara
5,572,655 A 11/1996 Tuljapurkar et al.
5,623,688 A 4/1997 Ikeda et al.
5,625,778 A 4/1997 Childers et al.
5,664,162 A 9/1997 Dye
5,898,895 A 4/1999 Williams
5,905,877 A 5/1999 Guthrie et al.
5,923,826 A 7/1999 Grzenda et al.
6,104,417 A 8/2000 Nielsen et al.
6,115,323 A * 9/2000 Hashimoto ............... 365/238.5
6,157,963 A 12/2000 Courtright et al.
6,157,989 A 12/2000 Collins et al.
6,202,101 B1 3/2001 Chin et al.
6,205,524 B1 3/2001 Ng
6,219,725 B1 * 4/2001 Diehl et al. .................... 710/26
6,469,703 B1 10/2002 Aleksic et al.
6,545,684 B1 * 4/2003 Dragony et al. ............ 345/531
6,570,571 B1 5/2003 Morozumi
6,853,382 B1 2/2005 Van Dyke et al.

* cited by examiner

*Primary Examiner*—Ulka J. Chauhan
*Assistant Examiner*—Mackly Monestime
(74) *Attorney, Agent, or Firm*—Cooley Godward LLP

(57) ABSTRACT

A graphics memory includes a plurality of memory partitions. A memory controller organizes tile data into subpackets that are assigned to subpartitions to improve memory transfer efficiency. Subpackets of different tiles may be further assigned to subpartitions in an interleaved fashion to improve memory operations such as fast clear and compression.

27 Claims, 7 Drawing Sheets

| | | | | | | |
|---|---|---|---|---|---|---|
| 601 | input bus | abcd | efgh | | – | |
| 606 | select | 0 | 1 | 1 | 0 | 0 |
| 604 | register | – | a,b | a,b | c,d | c,d |
| 605 | register | – | c,d | c,d | g,h | g,h |
| 607 | select | – | 0 | 1 | 0 | 1 |
| 602 | subpartition A bus | – | a | b | c | d |
| 603 | subpartition B bus | – | e | f | g | h |
| | time | Ø | 1 | 2 | 3 | 4 |

*FIG. 7*

MEMORY SYSTEM HAVING MULTIPLE SUBPARTITIONS

FIELD OF THE INVENTION

The present invention relates generally to a memory system in which the memory appears as a unified memory, but is comprised of a plurality of partitions. More particularly, the present invention is directed to improving the efficiency of memory accesses in a partitioned graphics memory.

BACKGROUND

In current graphics subsystems, the speed and number of graphical processing elements has increased enough to make the graphics memory subsystem a barrier to achieving high performance. FIG. 1 illustrates a graphics memory controller 100 of the prior art. The memory controller 10 acts as a switch to determine which of several graphics processing clients 12, 14, 16, 18, 20 can access the memory storage array 22, which is organized as a single, i.e., monolithic, partition. Typical graphics processing elements that are the memory clients include the host processor, a texture engine, a z-buffer engine, a color engine, a 2D-graphics engine, a 3D-graphics engine and a display engine. Each client 12, 14, 16, 18, and 20 requests one or more cycles of the memory storage array 22 which transfers in each cycle a data quantity equal to the size of the data bus 15 of the array.

The size of the memory data bus 15 sets the size of the minimum access that may be made to the graphics memory subsystem. Monolithic memory subsystems for the various graphics clients have evolved to use a wider memory data bus for increased throughput. However, this leads to inefficient accesses for some of the graphics processing elements of the graphics subsystem that may not need to access data requiring the full size of data bus 15.

Memory buses in current architectures are now typically 128 bits physically, and 256 bits (32 bytes), effectively, when the minimum data transfer requires both phases of single clock cycle. (Hereinafter, when referring to the size of the data bus, the effective size, rather than physical size is meant.) This size of the memory data bus sets the size of the minimum access that may be made to the graphics memory subsystem.

For some devices that make use of the graphics memory, 32 bytes is an acceptable minimum. However, the conventional minimum size of 32 bytes is inefficient because there are memory accesses for some of the clients 12, 14, 16, 18, and 20 that do not require the full minimum memory access size. In particular, as geometry objects become smaller and finer, a minimum access of 32 bytes has more data transfer bandwidth than is needed by the various graphics engines used to process graphical objects. One measure of inefficiency of the access is the ratio of used pixels to fetched pixels. As the size of the memory bus increases or the minimum access increases, this ratio becomes smaller. A small ratio implies a large amount of wasted memory throughput in the graphics memory subsystem. It is desirable to avoid this wasted throughput without altering the view to the memory clients of memory as a single unit.

In one proposed solution to the problems of this wasted throughput, it has been suggested to provide a memory system that includes a plurality of memory partitions. Such a multiple partition memory system is described in detail in U.S. patent application Ser. No. 09/687,453, entitled "Controller For A Memory System Having Multiple Partitions," commonly assigned to the assignee of the present invention, the contents of which are hereby incorporated by reference.

FIG. 2 shows a high-level block diagram of the system 200 proposed in U.S. patent application Ser. No. 09/687,453. A memory array 24 has a number of independently operable partitions 26*a*, 26*b*, 26*c*, 26*d*, each with a respective bus 28*a*, 28*b*, 28*c*, and 28*d* and a bus 27*a*, 27*b*, 27*c*, and 27*d* having a width w that is preferably a smaller transfer size than the single prior art bus 15 in FIG. 1. In one embodiment, there are four independent partitions P0, P1, P2, and P3 (elements 26*a*, 26*b*, 26*c*, 26*d*) each with a bus width one quarter the size of the non-partitioned bus, i.e., each with a 64 bit bus. Each of the memory system clients 12, 14, 16, 18, and 20 is connected to memory controller 30. Memory controller 30 includes a number of queues 32, 34, 36, 38, 40, 42, 44, 46 that connect to the partitions 26*a*, 26*b*, 26*c*, and 26*d* of memory array 24. Control logic (not shown in FIG. 2) determines the one or more partitions to which a request should be routed and the one or more partitions from which a response (read data) to a request should be obtained to maintain the appearance of a non-partitioned memory for the clients. Additionally, the control logic in the memory controller arbitrates among the various clients according to a priority assigned to each of the clients.

A drawback of the partitioned memory system proposed in U.S. patent application Ser. No. 09/687,453 is that the hardware requirements are larger than desired. Monolithic memory subsystems for the various graphics clients are evolving to use an increasingly larger memory data bus for increased throughput. For example, there is a trend in the graphics industry to increase the burst transfer length (BL) (e.g., from BL 4 to BL 8), which has the effect of increasing the minimum access size. Moreover, as described in the embodiment in U.S. patent application Ser. No. 09/687,453, each memory partition has its own hardware for controlling read and write operations to that partition in a coordinated fashion with the read/write operations to the remaining partitions. Thus, for each new partition added in the system the hardware implementation requirements increase as well. It would therefore be beneficial to have a partitioned memory system providing efficient memory access while not requiring a large increase in the hardware to implement a virtually unified memory architecture with high throughput.

SUMMARY OF THE INVENTION

A partitioned graphics memory provides that each partition of memory can be constituted by subpartitions. A tile is organized as data sections ("subpackets") having a data size corresponding to a subpacket for performing a memory transfer with a subpartition.

In one embodiment, each subpacket of a tile is assigned to a designated subpartition. The assignment may be further selected to facilitate data transfer operations. In one embodiment, a mask list is generated to select subpackets from the subpartitions of a partition.

In one embodiment, subpacket designations are swapped between different tiles to facilitate memory transfer operations, such as a fast clear or compression operation. In one embodiment, corresponding subpacket locations of two tiles have interleaved subpartition memory locations to permit a single memory access to a partition to access corresponding subpackets of the two tiles.

In one embodiment, each of the multiple subpartitions for a given partition shares the same controller hardware thereby expanding the bus width for a given partition without a corresponding expansion of controlling hardware.

BRIEF DESCRIPTION OF THE DRAWINGS

FIG. 7 is a table illustrating exemplary data signals at locations within the circuit of FIG. 6.

DETAILED DESCRIPTION

Figure 1:
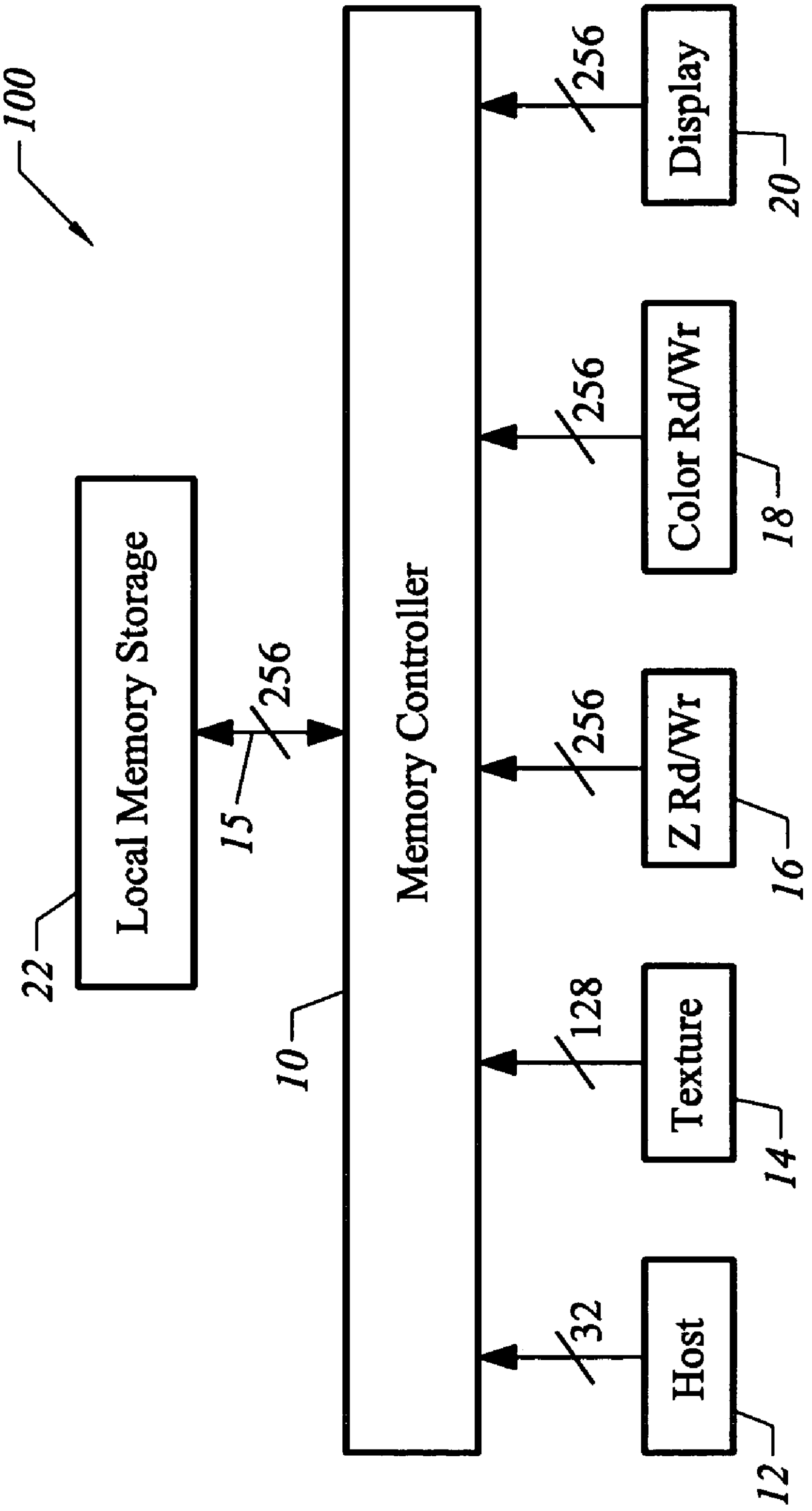
FIG. 1 (Prior Art)
FIG. 1 is a block diagram of a prior art memory system for a graphics system.
Figure 2:
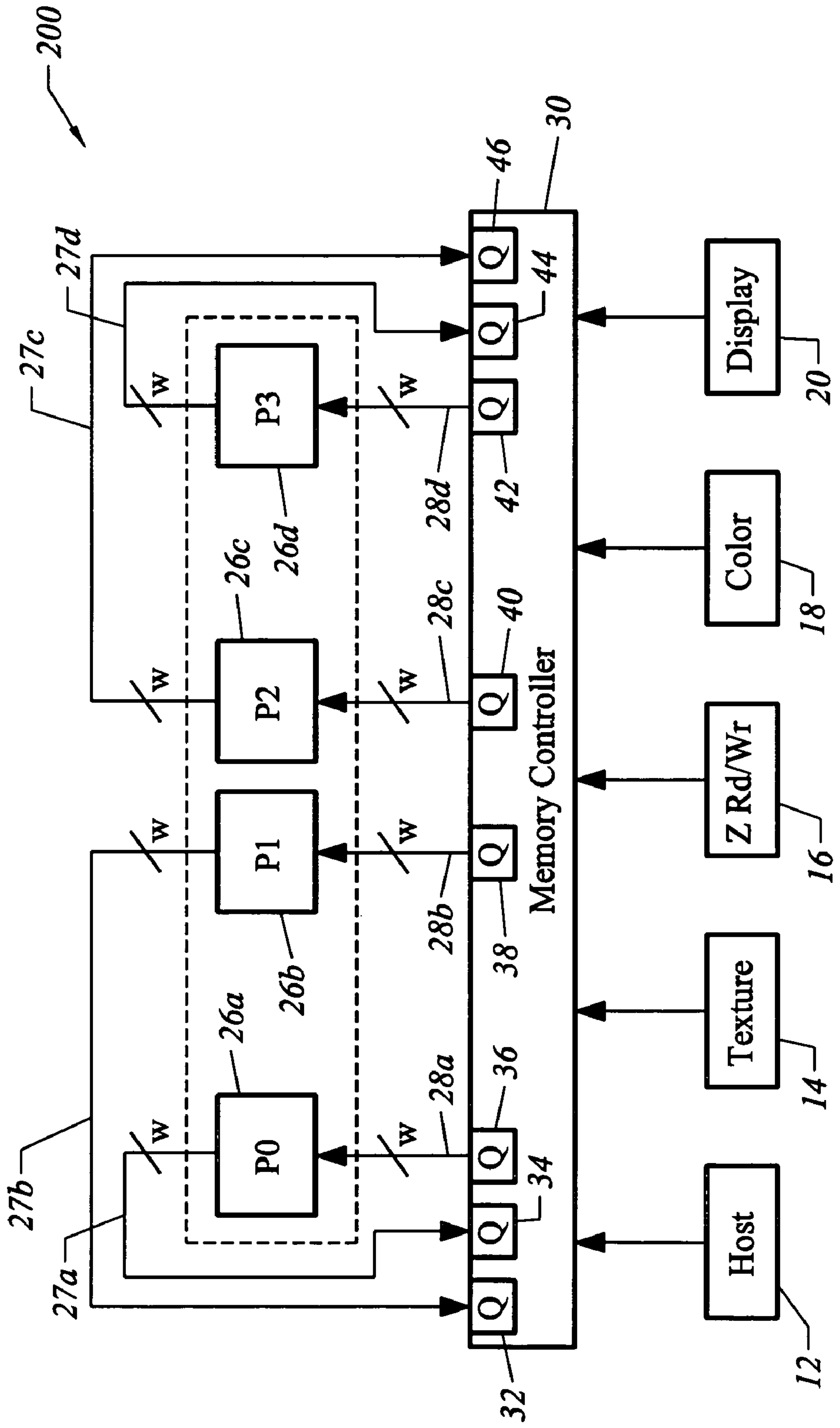
FIG. 2 (Prior Art)
FIG. 2 is a block diagram of a prior art partitioned memory.
Figure 3:
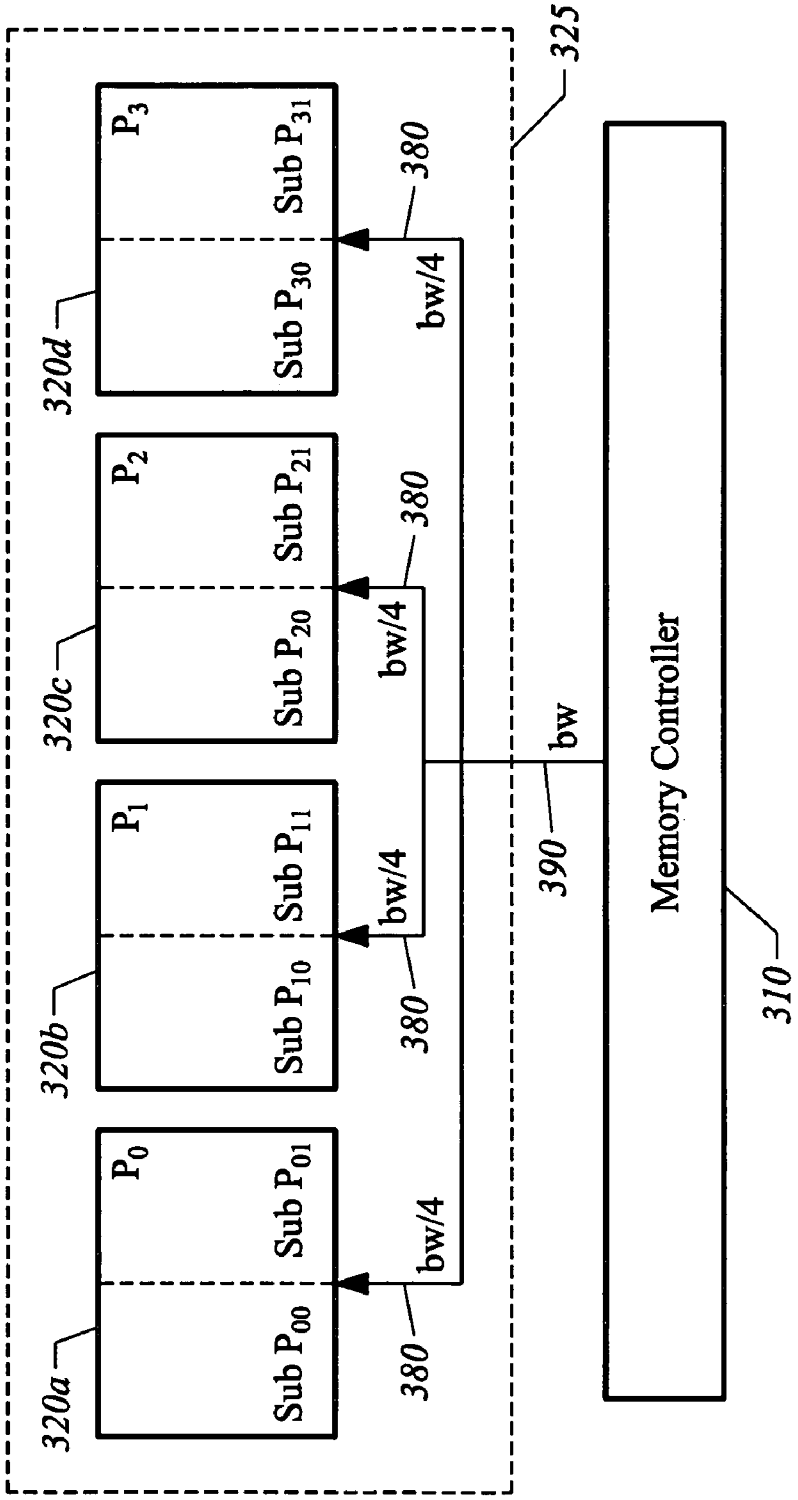
FIG. 3 is a block diagram of a partitioned memory system in accordance with one embodiment of the present invention.

FIG. 3 is a block diagram of one embodiment of a partitioned memory system 300 of the present invention. A memory structure 325 has a plurality of memory partitions 320*a*, 320*b*, 320*c*, and 320*d*. Each memory partition is further divided into at least two subpartitions. In an exemplary embodiment, each partition, also referred to as $P_0$, $P_1$, $P_2$, and $P_3$, is comprised of two subpartitions. For example, partition $P_0$ has subpartition $P_{00}$ and $P_{01}$. Partition $P_1$ has subpartitions $P_{10}$ and $P_{11}$. Partition $P_2$ has subpartitions $P_{20}$ and $P_{21}$. Finally, partition $P_3$ has subpartitions $P_{30}$ and $P_{31}$.

A memory controller 310 controls access to the respective subpartitions of each of the partitions 320*a*, 320*b*, 320*c*, and 320*d* that make up a virtually unified memory structure. The memory transfer access size of a full partition is a first size "a packet size" and the memory transfer access size of each subpartition is a second smaller size "a subpacket size." For example, in one embodiment, a main bus 390 having a bus width (BW) further branches into partition buses 380 each having a bus width BW/4. In turn, each sub-partition receives half of the partition bus bandwidth, or BW/8. In one embodiment of the present invention, the bus width for the memory controller is 256 bit memory arrangement where each of eight subpartitions includes a 32 pin wide dynamic random access memory (DRAM).

It is desirable to have DRAM access footprints in each memory sub-partition organized as rectangles (or preferably squares) of pixels or texels in X, Y (or u, v, p) with respect to a surface. This corresponds to operating on tiles of information rather than lines of information. In a tiled graphics memory, a data representing a 3D surface is organized in memory as an array of tiles, with each tile corresponding to a portion of a representation of a surface. As an example, each tile may correspond to an array of pixels, such as a group of eight pixels. In turn, data representing a 3D surface corresponds to an array of tiles. In one embodiment, tile data for a particular tile is stored in one of the partitions. However, the tile data is further organized into the subpartitions of that tile for efficient memory access during read and write operations. As will be described below in more detail, in some embodiments at least some nearby tiles are also preferably stored in the same partition.

Figure 4:
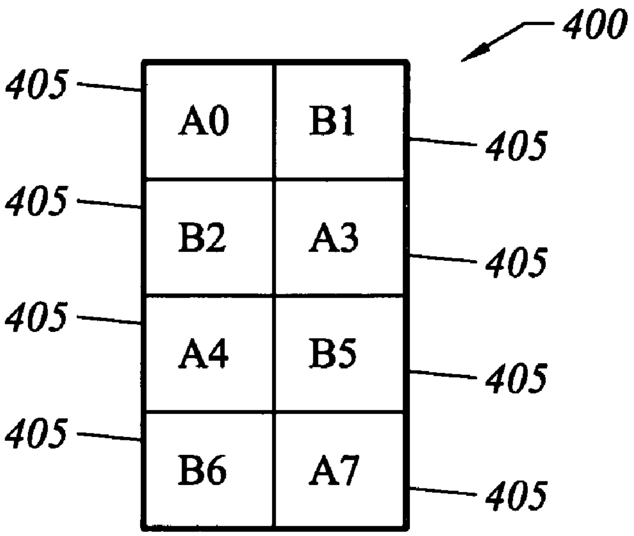
FIG. 4 illustrates pairing of data subpackets for data transfer to a partition in accordance with one embodiment of the present invention.

Memory controller 310 includes at least one processing operation for which it is sub-partition aware. Referring to FIG. 4, each tile 400 is subdivided into data sections 405, with each data section corresponding, in some embodiments to data associated with one pixel. Each data section 405 has a data size corresponding to a memory transfer size of a sub-partition, i.e., a subpacket size. Consequently, throughout the following discussion, each data section of a tile 400 will be referred to as a subpacket 405. Organizing tile data into subpackets permits memory controller 310 to organize data read and write operations with the minimum memory footprint associated with the subpacket size of the subpartitions. Also, it will be understood that a memory access to a single partition has a corresponding data packet size. Additional background on a tiled memory having data sections arranged as subpackets is described in the patent application of James Van Dyke et al., entitled "System And Method For Packing Data In A Tiled Graphics Memory," filed on Dec. 17, 2003, U.S. Patent Application Ser. No. 10/740,229, which is commonly owned by the assignee of the present invention, the contents of which are hereby incorporated by reference.

In one memory transfer to a partition by memory controller 310, each subpartition of the partition may be accessed. Within one partition having two subpartitions, such as $P_0$, data sections may be read or written from both two sub-partitions (e.g., subpartitions $P_{00}$ and $P_{01}$ of partition $P_0$) in single memory transfer to the partition. In one embodiment, memory controller 310 generates a mask to indicate which subpackets 405 of a tile should be paired together as a packet for a given read transfer or write transfer of a partition.

FIG. 4 illustrates a sample pairing of subpackets 405 of a tile 400 with associated subpartitions in which data for the data sections is read or written. In this illustrative example, each tile 400 has a total of eight subpackets. A subpartition designation is assigned to each subpacket in tile 400 to associate each subpacket with a subpartition. In this arrangement, "A" and "B" represent a subpartition designation for a given partition (for example "A" corresponding to $P_{00}$ and "B" corresponding to $P_{01}$ of partition $P_0$). Thus, data subpackets 0, 1, 2, 3, 4, 5, 6, and 7 of a tile are each assigned either an "A" designation or a "B" designation (i.e., A0, A3, A4, A7, B1, B2, B5, and B6). The A subpartition and the B subpartition each have a memory transfer data size corresponding to half the packet size for performing a memory transfer with the entire partition.

In one embodiment, memory controller 310 generates a transfer list for determining the order with which subpackets of a tile are transferred to and from the subpartitions. It is possible for the memory controller 310 to access an A subpacket and a B subpacket within tile 400 with a single access to the partition (e.g., a single data packet to the partition within which tile 400 resides). Sub-partitions A and B have a degree of addressing independence. This allows simultaneous access of one A, B pair of data subpackets A and B from those marked A0, A3, A4, A7 and B1, B2, B5, B6 in FIG. 4. In one embodiment, an ordered list is generated for each subpartition to identify the order with which memory transfer operations, such as read or write operations, will take place with respect to the A, B pair of subpartitions. The ordered list may, for example, be implemented as mask information, such as a mask list, for each subpartition.

In one embodiment, memory controller 310 generates a 4 bit mask for each sub-partition For example, an A mask list has associated with it a mask field of elements 0, 3, 4 and 7 represented as A [xxxx] for memory transfer operations with the A subpartition. A B mask list has a mask field of elements 2, 1, 6, and 5 represented as B [yyyy] for memory transfer operations with the B subpartition. As an illustrative example, assume that the mask list generated by memory controller 310 for the A subpartition is A[1001] while the mask list generated for the B subpartition is B[1101], where 1 in each instance indicates the existence of a subpacket for that entity, then the subpartition transfer arrangement will take place in the following order. Transfer 0 will include A0 and B2. Transfer 1 would include A7 and B 1. The final data transfer would be for B5 alone since the A mask list does not identify a third subpacket. Since sub-partition A only accesses the subpackets A0, A3, A4, A7 and sub-partition B can only access subpackets B1, B2, B5, B6, only A and B accesses can be paired.

In one embodiment of the present invention, an eight subpacket tile includes 8 subpackets each of 16 Bytes such that a horizontal access of two subpackets results in 32 byte by 1 horizontal line (such as subpackets A0 and B1). Alternatively, an arbitrary small square of 16 bytes by 2 lines can be accessed when a vertical access is undertaken. For example, the ordered list may call for an access of A0 and B2.

Figure 5:
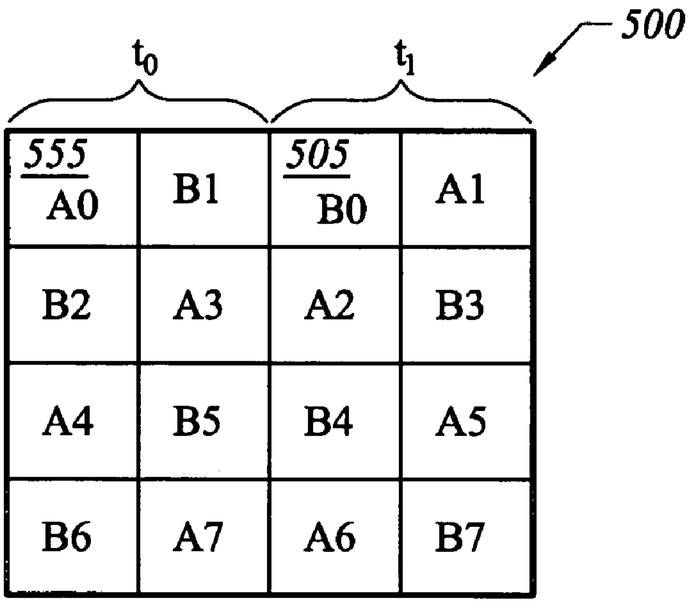
FIG. 5 illustrates subpacket interleaving of adjacent tiles in accordance with one embodiment of the present invention.

As previously discussed, data associated with a representation of a 3D surface is organized in memory as an array of tiles. A single partition may provide memory for many nearby tiles. In some embodiments, tile data within a partition is further arranged to facilitate memory operations to be performed simultaneously on two or more tiles associated with a partition. FIG. 5 illustrates two tiles 500 with individual tiles T0 and T1, which are designated as an even tile and an odd tile, respectively. The tiles are both associated with a single partition that has an A subpartition and a B subpartition as previously described in regards to an individual tile. The A, B designations are swapped in corresponding tile locations of the odd tile and the even tile, which can also be described as an interleaving process, since corresponding tile locations of odd and even tiles are associated, in an interleaved manner, with the two different subpartition memory locations. For example, while representative location 505 of odd tile T1 is paired with a B subpartition, a corresponding tile location 555 of even tile T0 is paired with an A subpartition. Thus, as can be seen in FIG. 5, all corresponding tile locations of even numbered tile T0 and odd numbered tile T1 have their subpartition designations swapped. Tile T0 has subpartition A with mask bits 0, 3, 4 and 7 and the B subpartition with mask bits 1, 2, 5, and 6. However tile T1 has subpartition B having mask bits 0, 3, 4 and 7 while subpartition A has mask bits 2, 1, 6 and 5.

The swapped subpartition designations illustrated in FIG. 5 permits a single A, B memory access of a partition to be used to access corresponding subpackets of odd and even tiles stored within the partition. Thus, for example, if subpacket "0" is used for a tile operation, then by interleaving the A, B designations as shown in FIG. 5 a single A, B memory transfer can be used to access both "0" subpackets 505 and 555 of an odd tile and an even tile which are interleaved in the manner described above. One application of this interleaving is in a fast clear operation. In a fast clear operation, blocks of data subpackets are written as part of a clearing operation. Interleaving the subpackets permits a fast clear of two tiles at once in which a write is simultaneously performed to corresponding subpackets of each of the two tiles for a fast clear of respective tiles. By alternating this arrangement over odd and even tiles, it is possible in a 32B partition for an 8 x fast clear operation to simultaneously write a 16B subpacket A0 of tile T0 and a 16B subpacket B0 of tile T1 in a single 32B access.

The alternate sub-packet interleaving of odd and even tiles illustrated in FIG. 5 also allows pairing of A and B sub-partition accesses of compressed data (compressed data will typically reside in the same numbered subpacket) in two nearby tiles. If an 8 x compression scheme is used for a fast clear format, a fast clear compressed tile may be represented by 16B in the "0" position. Thus, for example, if a 8 x compression permits all of the tile data to be compressed form in the "0" position, a single A, B memory transfer may be used to access the compressed data in tile T0 and tile T1.

Interleaving of odd and even tiles also supports various forms of data compression. Data is compressed typically for the reduction of memory bandwidth requirements to transfer a given amount of information. Compressed data may be stored in a small number of subpackets, less than the number of an entire tile. By subpacket interleaving as previously described, the likelihood of having A, B subpackets available that may be paired increases for a given locality of rendering. Subpackets from A, B subpartitions from different tiles may then be easily paired. Subpartitioning combining A, B subpackets across tile boundaries also allows the compressed data to occupy the size of only one subpacket or an odd number of subpackets. This allows higher or variable compression ratios for a given tile size.

Pairing of subpackets of different nearby odd and even tiles is not restricted to compressed data. Uncompressed or compressed and uncompressed subpacket data may be paired. The pairing between subpackets of different tiles may also be selected to increase DRAM data transfer efficiency. In this embodiment, the pairing is selected to pair tiles across tile boundaries to reduce memory transfers. These may include, for example, pairing subpackets based upon a memory location attribute or upon a data operation attribute. For example, nearby tiles may have subpacket interleaving in horizontal or vertical directions.

As previously described, in one embodiment each subpartition includes a DRAM. The DRAM of a subpartition is addressable by column, bank, and row. In one embodiment, tile addressing is organized such that subpackets within a tile share the same DRAM bank address and the same DRAM row address. In some embodiments, the tile addressing is further organized such that subpackets within a tile also share some of the DRAM column address. Moreover, operations to all subpartitions within a partition may be identical to facilitate the use of a common memory controller. For example, subpartitions within a partition may receive identical commands not restricted to read, write, precharge, activate, mode register set (MRS), and extended mode register set (EMRS), such that all subpartitions within a partition may be served by one common memory controller. Moreover, all subpartitions within a partition may share the same DRAM bank address and the same DRAM row address. In some embodiments, all subpartitions may share some of the DRAM column address. An additional benefit of this organization of tile addressing is that it also facilitates reduced chip I/O to the DRAMs of the subpartitions because some address and command pins of the subpartitions are identical and may be shared.

Controller 310 may use one or more rules for determining an efficient A, B pairing between subpartitions from different tiles for reducing memory transfers. One rule that may be applied is that paired A, B subpartitions have the same DRAM bank address with the partition. Another rule that may be applied is that paired A, B subpartitions are from the same DRAM row address within the partition. Still another rule that may be applied is that paired A, B subpartitions may share some of the column address on any DRAM address of the partition. Still yet another rule that may be applied is that paired subpartitions A, B both are performing a read or write operation of tiles.

Embodiments of the present invention also include other applications of interleaving. In one embodiment, subpartitions are interleaved within a tile for A, B, subpartition load balancing. In an alternate embodiment, a tile is assigned to only one subpartition and alternating or nearby tiles are assigned to the other subpartitions. A benefit of this alternate embodiment is that it permits a single tile access to access only one subpartition DRAM, allowing more independence between the subpartition DRAMs.

Figure 6:
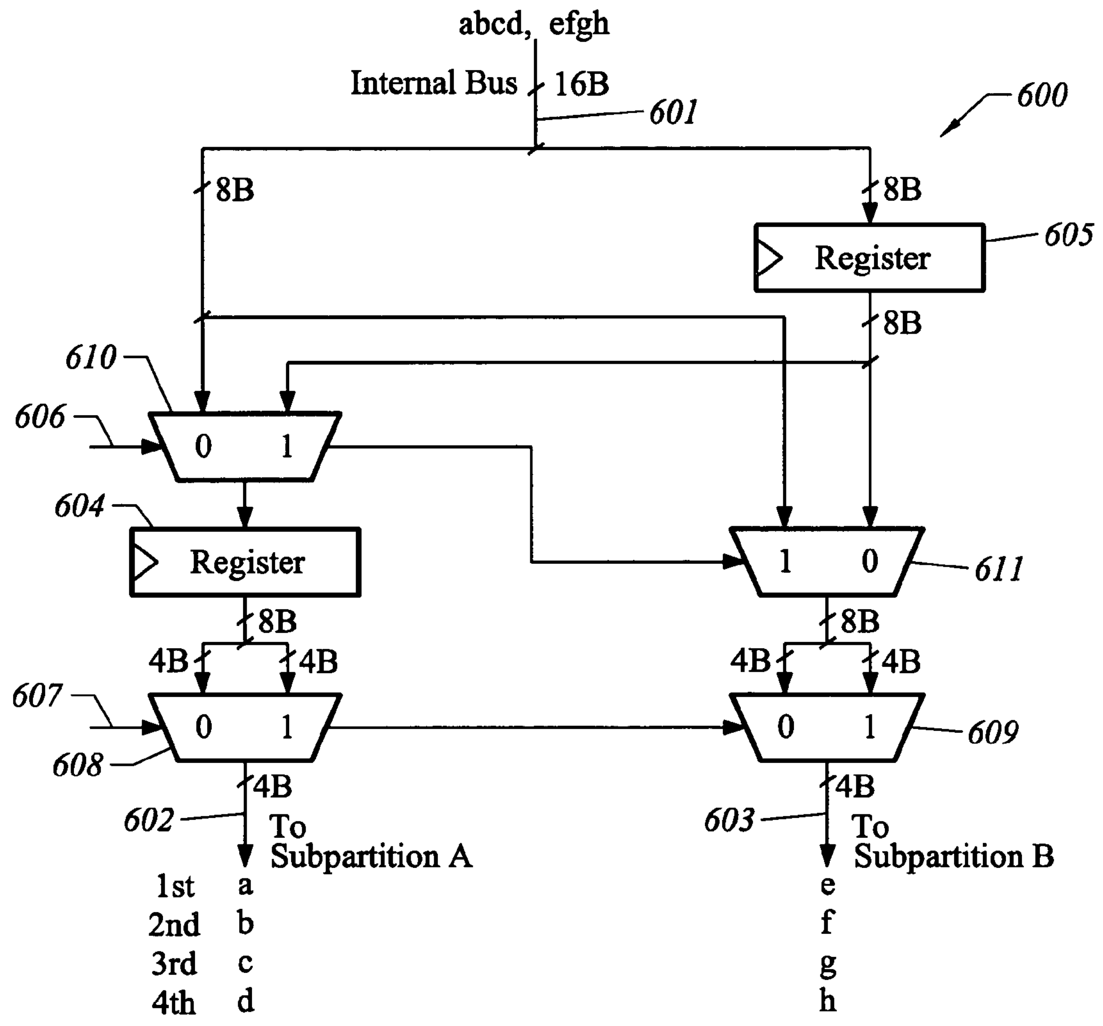
FIG. 6 illustrates a circuit for transferring data into memory subpartitions in accordance with one embodiment of the present invention.

FIG. 6 illustrates an embodiment of a circuit 600 for transferring data from an internal bus to subpartitions A, B. In this embodiment, each subpartition stores a contiguous 16B of data. The DRAM in subpartition A holds the contiguous 4 byte data quantities a, b, c, d and expects data presented in that order from bus 602. Subpartition B holds the contiguous 4 byte data quantities e, f, g, h and expects data presented in that order from bus 603. Data bus 601 is 16 bytes wide and presents data in two successive 16B quantities first as abcd, and on the second transfer as efgh. DRAMs transfer data on the rising and falling edges of the DRAM clock, hence the use of muxes 608 and 609. A means is therefore required to rearrange the data from bus 601 for output to buses 602 and 603.

FIG. 7 is a table demonstrating how circuit 600 rearranges data from input bus 601 to subpartition output buses 602 and 603. At time 0, 16 bytes of data abcd is presented to input bus 601. Mux select 606 is "0" and steers the lower 8 bytes data a, b into register 604.

At time 1, input data 601 is 16 bytes efgh. Register 604 contains 8 bytes data a, b, and register 605 contains 8 bytes data c, d. Mux select 606 is "1" and steers register 605 8 bytes data c, d through mux 610 to the input of register 604. Mux select 606 is "1" and steers 8 bytes input data ef through mux 611 into the input of subpartition B mux 609. Register 604 provides subpartition A mux 608 with 8 bytes data ab. Select 607 is "0", causing muxes 608 and 609 to steer 4 bytes data a and 4 bytes data e into subpartition buses 602 and 603 respectively.

At time 2, select 607 is "1", causing muxes 608 and 609 to steer 4 bytes data b and 4 bytes data f into subpartition buses 602 and 603 respectively.

At time 3, register 604 contains 8 bytes data cd, and register 605 contains 8 bytes data gh. Select 606 is "0" and steers 8 bytes data gh into subpartition B mux 609. Register 604 provides 8 bytes data cd into subpartition A mux 608. Mux select 607 is "0" and steers 4 bytes data c through subpartition A mux 608 onto subpartition A bus 602. Mux select 607 is "0" and steers 4 bytes data g through subpartition B mux 609 onto subpartition B bus 603.

At time 4, mux select 607 is "1" and steers 4 bytes data d through subpartition A mux 608 onto subpartition A bus 602. Mux select 607 is "1" and steers 4 bytes data h through subpartition B mux 609 onto subpartition B bus 603.

Figure 8:
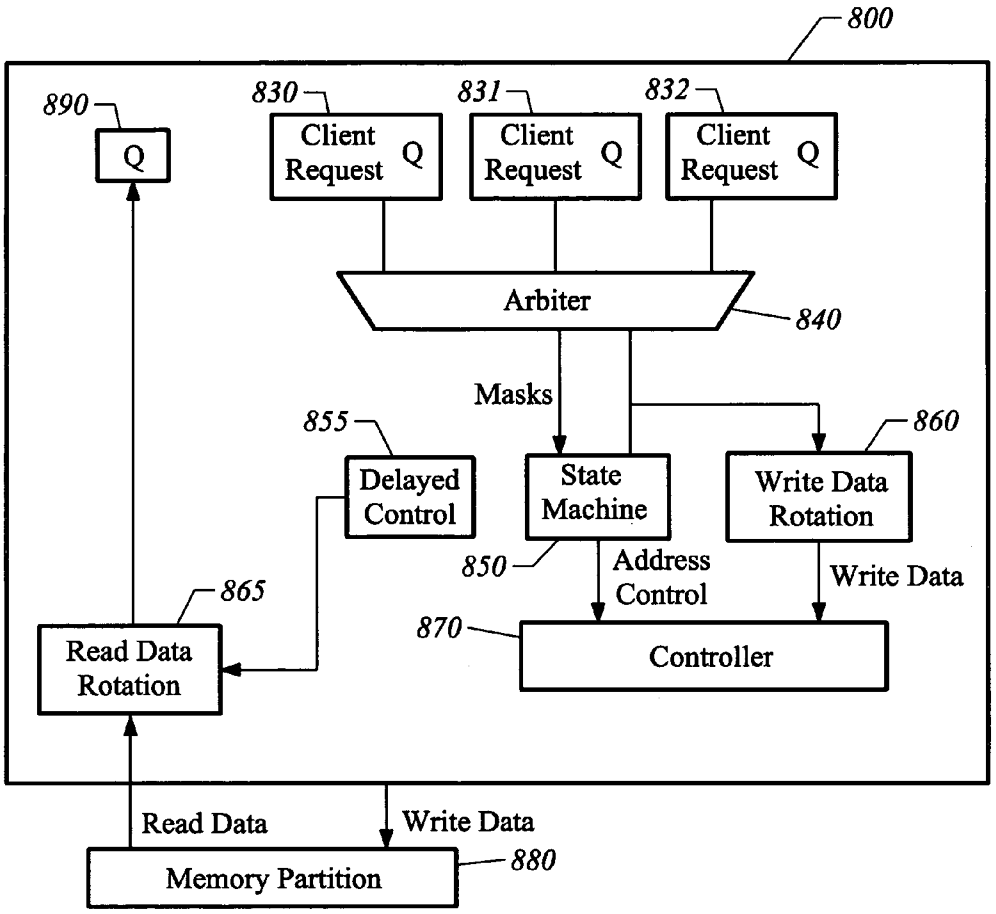
FIG. 8 is a block diagram of a portion of a memory controller in accordance with one embodiment of the present invention.

FIG. 8 is a functional block diagram illustrating a control module 800 for pairing and unpairing subpackets. Control module 800 is disposed within memory controller 310 (not shown). Control module 800 is illustrated as servicing sub-partitions within a single partition, but could be replicated for each of the numerous partitions that make up the unified memory. As is illustrated in FIG. 8, control module 800 can include a plurality of queues such as client request queues 830, 831 and 832, each providing temporary storage for incoming data from a given client. Arbiter 840 selects a given queue to have its request satisfied utilizing techniques already known to those skilled in the art.

To the extent that a given client is subpartition aware (for example, a raster operations (ROP) client may be a subpartition-aware client) the arbiter 840 passes the mask list information on to state machine 850 and arranges for the generation of address control operations consistent with the data subpacket ordering required by the masks. At the same time write data can be supplied to a write data rotation element which operates on the principles described above so as to place the data from the selected client into an appropriate order for transmission to the memory partition whereby subpackets for each subpartition are paired together.

The write data and address control information are supplied to subcontroller 870 that then operates to control the passage of the write data to the respective memory subpartitions of memory partition 880. Similarly, the subcontroller 870 using address control information generated by the state machine can provide for access to the memory partition whereby subpackets from respective subpartitions of the partition are accessed at the same time and provided as read data to read data rotation device 865. Read data rotation device 865 provides the opposite operation of the write data rotation. Namely, it takes the paired data subpackets and then sends them out in a given order as required by the output queue 890 for transfer to a given client.

However, it will be understood in regards to the operation of memory controller 310 that in some embodiments a subpartition aware client may submit and receive data in the order specified by the subpartition mask lists. In other embodiments, memory controller 310 may accept memory requests and perform the pairing itself.

One application of the present invention is in improving the efficiency of memory operation in graphics memories. In 3-D graphics, elements are represented by geometric shapes having particular characteristics, such as a triangle. Because the footprint of a triangle (or other polygon) is of irregular orientation, shape, and size, the area of the triangle on the memory access tile grid may partially cover tiles. For example, a vertex of a triangle may cover a portion of a memory access tile, but not the entire tile. As a result, memory accesses to these partially covered tiles transfer unwanted data, resulting in wasted memory bandwidth and loss of memory system efficiency. By reducing the memory access footprint in accordance with the present invention, memory transfers may more closely outline the needed triangle area and reduce the transfer of unwanted data. This also has the effect of reducing the number of memory accesses needed to retrieve just that level of information that is desirable.

The architecture of the present invention provides the memory controller with the capability of tightly interleaving data to memory subpartitions so as to create a unified memory arrangement with improved efficiency in data accesses. That is, even as the bus width for the memory data bus expands, by providing interleaved access at a finer granular level, it is possible to assure that there is a more full or complete use of the overall bus width, that is, that bus width is not wasted when smaller atoms of data need to be accessed, as for instance in connection with tile data processing.

Another benefit of embodiments of the present invention is that in some embodiments its permits a more efficient use of wider data bus widths by subpartitioning memories and then interleaving data accesses to and from such memories utilizing masked list information where a given client that is seeking such access is aware of the subpartitioning structure.

Another benefit of the present invention is that in some embodiments it reduces the hardware complexity of a highly partitioned graphics memory. Each of the multiple subpartitions for a given partition shares the same controller 800 hardware thereby expanding the bus width for a given partition without a corresponding expansion of controlling hardware.

Another benefit of the present invention is that in some embodiments is that it permits a reduction in the data transfer atom, or minimum data size, for compression of tile data. This benefits compression in several different ways. First, a small atom size permits higher compression ratios. Second, a smaller atom size permits a reduction in the data size of compressed tiles.

The present invention may also reduce package address pin count because most of the address pins between subpartition A and B DRAMs are logically identical and may be physically shared. In an embodiment with eight subpartition subpackets per tile that pairs subpackets between A and B subpartitions within and the same tile, and adjacent tiles, only three column address bits are required to be unique to each subpartition. Additionally, the present invention allows the use of DRAMs with larger minimum burst transfer length while minimizing the data transfer atom.

While an exemplary embodiment includes two subpartitions per partition, more generally it will be understood that embodiments of the present invention may include more than two subpartitions per partition.

While a single embodiment of the present invention has been described in connection with this application, variations on this embodiment would be readily understood by one of ordinary skill in the art. For instance, there could be an alternate number of partitions different than four (e.g., greater than four or less than four). Moreover, there could be an alternate number of total subpartitions to construct the unified memory. Additionally, a non-partitioned or a single partitioned memory system may be subpartitioned. In addition, the number of additional address lines in connection with the implementation may vary depending on the DRAM architecture employed.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention

What is claimed is:

1. A method of organizing tile data in a partitioned graphics memory having a plurality of partitions, comprising:

organizing tile data as an array of subpackets of information, wherein each subpacket has a tile location and a data size corresponding to that of a memory transfer data size of subpartitions of said partitioned graphics memory;

for a first tile associated with one particular partition having a first subpartition and a second subpartition, pairing a first set of subpackets having a first set of tile locations with said first subpartition and pairing a second set of subpackets having a second set of tile locations with said second subpartition, wherein tile data may be accessed with a memory transfer data size less than that associated with a partition; and for a second tile associated with said one particular partition, pairing a first set of subpackets having said second set of tile locations with said first subpartition and pairing a second set of subpackets having said first set of tile locations with said second subpartition;

wherein corresponding tile locations in said first tile and said second tile are paired with different subpartitions.

2. The method of claim 1, further comprising:

for a data transfer operation associated with said first tile, generating a first ordered list for transferring subpackets associated with said first subpartition and generating a second ordered list for transferring subpackets associated with said second subpartition;

for each memory access to said one particular partition associated with said first tile, accessing said first subpartition and said second subpartition according to said first ordered list and said second ordered list.

3. The method of claim 1, further comprising: performing a memory transfer operation to said one particular partition to simultaneously access corresponding tile locations in said first tile and said second tile.

4. The method of claim 3, further comprising: performing a fast clear operation on said first tile and said second tile.

5. The method of claim 3, further comprising: performing a compression operation on said first tile and said second tile.

6. The method of claim 5, further comprising: storing compressed tile data in one subpacket of each of said first tile and said second tile.

7. The method of claim 6, further comprising: storing compressed data in an odd number of subpackets of each of said first tile and said second tile.

8. The method of claim 3, wherein said first tile and said second tile correspond to nearby tiles.

9. The method of claim 3, wherein tiles stored in a partition are assigned as either odd tiles or even tiles, wherein said first tile is an even tile and said second tile is an odd tile.

10. The method of claim 1 wherein each subpacket corresponds to data for at least one pixel.

11. The method of claim 1, wherein each subpartition comprises a DRAM.

12. A tiled graphics memory, comprising:

a plurality of memory partitions, each partition having at least two subpartitions for storing data, each partition having an associated first memory access size and each subpartition having an associated second memory access size; and a memory controller configured to organize tile data into subpackets of information having said second memory access size, said memory controller assigning a tile to one selected partition and pairing each subpacket of said tile with one of said at least two subpartitions.

13. The tiled graphics memory of claim 12, wherein said memory controller is configured to generate a mask list for each subpartition of said tile to determine an order with which subpackets of a said tile are transferred.

14. The tiled graphics memory of claim 13, wherein said memory controller is configured to interleave subpartition locations within said one selected partition for corresponding tile locations of a first set of tiles and a second set of tiles.

15. The tiled graphics memory of claim 14, wherein said memory controller is adapted to perform a fast clear operation.

16. The tiled graphics memory of claim 12, wherein each partition has a first subpartion and a second subpartition, said memory controller for said tile pairing a first set of subpackets having a first set of tile locations with said first subpartition of said one selected partition and pairing a second set of subpackets having a second set of tile locations with said second subpartition of said one selected partition.

17. The tiled graphics memory of claim 16, wherein said memory controller generates a first ordered list for transferring subpackets associated with said first subpartition and a second ordered list for transferring subpackets associated with said second subpartition so that for each memory access to said one selected partition said memory controller accesses said first subpartition and said second subpartition according to said first ordered list and said second ordered list.

18. The tiled graphics memory of claim 16, wherein for a second tile associated with said one selected partition said memory controller pairs a first set of subpackets having said second set of tile locations with said first subpartition and pairs a second set of subpackets having said first set of tile locations with said second subpartition so that corresponding tile locations in said first tile and said second tile are paired with different subpartitions.

19. The tiled graphics memory of claim 18, further comprising: performing a memory transfer operation to said one selected partition to simultaneously access corresponding tile locations in said first tile and said second tile.

20. The tiled graphics memory of claim 19, further comprising: performing a fast clear operation on said first tile and said second tile.

21. The tiled graphics memory of claim 19, further comprising: performing a compression operation on said first tile and said second tile.

22. The tiled graphics memory of claim 21, further comprising: storing compressed tile data in one subpacket of each of said first tile and said second tile.

23. The tiled graphics memory of claim 21, further comprising: storing compressed data in an odd number of subpackets of each of said first tile and said second tile.

24. The tiled graphics memory of claim 19, wherein said first tile and said second tile correspond to nearby tiles.

25. The tiled graphics memory of claim 19, wherein tiles are assigned as either odd tiles or even tiles, wherein said first tile is an even tile and said second tile is an odd tile.

26. The tiled graphics memory of claim 12, wherein each subpacket corresponds to data for at least one pixel.

27. The tiled graphics memory of claim 12, wherein each subpartition comprises a DRAM.

* * * * *